United States Patent [19]

Knapp et al.

[11] Patent Number: 5,838,308
[45] Date of Patent: Nov. 17, 1998

[54] OPTICAL TOUCH INPUT DEVICE

[75] Inventors: Alan G. Knapp, Crawley; John M. Shannon, Whyteleafe, both of United Kingdom

[73] Assignee: U.S. Philips Corporation, New York, N.Y.

[21] Appl. No.: 869,276

[22] Filed: Apr. 15, 1992

[30] Foreign Application Priority Data

Apr. 17, 1991 [GB] United Kingdom .................... 9108226

[51] Int. Cl.$^6$ ...................................................... G09G 3/28
[52] U.S. Cl. .......................... 345/173; 345/182; 345/207; 349/12
[58] Field of Search .................................... 340/707, 712, 340/706; 178/18; 359/59, 70; 235/462; 358/213.28; 250/208.1; 345/173, 175, 176, 179, 182, 183, 207; 349/12

[56] References Cited

U.S. PATENT DOCUMENTS

| | | | |
|---|---|---|---|
| 4,345,248 | 8/1982 | Togashi et al | 340/784 |
| 4,432,610 | 2/1984 | Kobayashi et al. | 359/70 |
| 4,655,552 | 4/1987 | Tagashi et al. | 350/342 |
| 4,679,909 | 7/1987 | Hamada et al. | 340/707 |
| 4,797,546 | 1/1989 | Berger et al. | 358/213.28 |
| 4,866,291 | 9/1989 | Shimada et al. | 250/208.1 |
| 4,894,523 | 1/1990 | Chadima, Jr. et al. | 235/462 |
| 5,083,175 | 1/1992 | Hack et al. | 357/30 |
| 5,151,688 | 9/1992 | Tanaka et al. | 359/59 |
| 5,204,661 | 4/1993 | Hack et al. | 340/707 |

FOREIGN PATENT DOCUMENTS

| | | |
|---|---|---|
| 0384509 | 8/1990 | European Pat. Off. . |
| 0491436 | 6/1992 | European Pat. Off. . |

OTHER PUBLICATIONS

Markus, John; Modern Electronic Circuits Reference Manual, 1980, p. 712.

*Primary Examiner*—Steven Saras
*Attorney, Agent, or Firm*—William L. Botjer

[57] ABSTRACT

An optical touch input device comprises an array of actively addressed sensing elements (18) for sensing a light input, e.g. from a light pen, each of which comprises a capacitor (25) which is charged periodically through operation of a switch device (24) and a discharge circuit, including a photosensitive device (28) and a further switch device (27) connected across the capacitor, which circuit in operation demonstrates an optical threshold characteristic whereby the capacitor (25) is discharged in response to the sensing elements being subjected to light which is at or above a predetermined intensity level so as to discriminate from ambient light. Elements written into are determined by detecting the charge stage of their capacitors. The sensing element array can be integrated with a matrix display device with the sensing elements (18) and display elements components (12) provided on a common support using thin film technology.

10 Claims, 2 Drawing Sheets

OPTICAL TOUCH INPUT DEVICE

BACKGROUND OF THE INVENTION

This invention relates to an optical touch input device comprising an array of sensing elements each of which comprises a photosensitive device responsive to light input from a light source and a switching device. The invention relates also to a display device incorporating such an optical touch input device.

Optical touch input devices of the above kind can be used as means for inputting information, for example in the form of numerals, characters, pictures and the like, and may be employed for example as an interface in a computer system. Information can be entered by a user into the system by writing over the array with a light pen, the movement of the pen being detected by monitoring the behaviour of the sensing elements. An example of such a device is described in U.S. Pat. No. 4,345,248. This device comprises also a matrix liquid crystal display, the array of sensing elements being integrated with the array of display elements in a common panel. The sensing elements are arranged in rows and columns and are connected to drive and detection circuits via row and column conductors with the photosensitive device of a sensing element being coupled to respective row and column conductors through its switching device, which comprises a TFT (thin film transistor). The photosensitive device comprises a pair of pn junctions coupled back to back and becomes conductive when illuminated. As such the photosensitive devices are responsive to various levels of illumination, and can respond to ambient illumination in addition to light from a light pen. The sensing element array is operated by applying a gating signal to the TFTs of each row in turn so as to connect the photosensitive devices of the row of sensing elements to a detection circuit which is responsive to an increase in the conductance of a photosensitive devices caused by illumination from a light pen. Consequently, for an input to be detected the illumination of a sensing element must coincide with the gating of the TFT of the sensing element concerned.

In U.S. Pat. No. 4,655,552 there is described a matrix liquid crystal display device with an integrated light sensing element array in which the arrays of display and sensing elements are addressed via separate sets of row and column conductors. Each sensing element comprises a photodiode and an output diode connected back to back between a row conductor and a column conductor, and a storage capacitor connected at its one side to the node between the two diodes and at its other side to the row conductor. The photodiode produces a leakage current which is generally proportional to the level of incident light. A scanning signal is periodically applied to the row conductor while a fixed potential is applied to the column conductor and the condition of the sensing element is determined by sensing the current flow in the column conductor during scanning which is dependent on the potential existing at the node between the photodiode and output diode. The sensing response of this type of sensing element is dependent both on light and time. The potential at the node changes in the interval between scanning according to the level of illumination applied to the photodiode and also the time for which that illumination is applied. The sensing element has an integrating function and measures the total amount of light which falls on the photodiode in the interval between scanning and can not discriminate between a high level of light intensity applied for a short time and a comparatively low level of light intensity applied for a longer time. This can lead to problems in operation. Thus, for example, a relatively high level of ambient illumination could produce the same response as that achieved with a light pen. Moreover, with this type of sensing element there will be a limit as to the speed at which the pen can be moved over the sensing elements for a given level of ambient illumination if detection is to be ensured.

It is an object of the present invention to provide an improved optical touch input device.

More particularly, it is an object of the invention to provide an optical touch input device in which the sensing elements are adapted to distinguish more clearly between an intended input, for example from a light pen, and, for example, the effects of ambient light.

According to the present invention, there is provided an optical touch input device comprising an array of sensing elements, each of which sensing elements comprises a photosensitive device responsive to a light input from a light source, a switching device, and a charge storage means which is charged periodically by operation of the switching device, and detection means connected to the sensing elements for detecting periodically the state of charge of their charge storage means, which is characterised in that the photosensitive device comprises part of a discharge circuit connected to the charge storage means which has an operational threshold characteristic such that it is operable to discharge the charge storage means in response to light falling on the photosensitive device which is at or above a predetermined intensity level. In this device, therefore, the sensing elements are rendered capable of readily distinguishing between light from a light source, for example a light pen, and ambient light, assuming that the former has greater intensity than the latter. The discharge circuit introduces an optical threshold effect wherein the state of a sensing element, and more particularly the charge state of the charge storage means, for example a capacitor, is changed only in response to the sensing element being exposed to illumination of sufficient level so as to reach the optical threshold of the sensing element. In practice, the threshold level can be set by selecting component values so that it lies above the level which can be expected for typical ambient lighting but below the level which can be achieved by known light sources, for example incorporated in a light pen. Consequently, a clear, unambiguous indication of "touching" of the sensing elements is obtained and the possibility of a sensing element being affected by light from ambient surroundings to cause an unwanted indication is prevented, or at least significantly reduced. Moreover, the prolonged exposure of the sensing elements to ambient lighting levels has no effect.

Preferably, the discharge circuit comprises a switch circuit which switches to discharge the charge storage means in response to the photosensitive element being subjected to light which is at above or predetermined intensity level. The switching behaviour ensures a desirable positive response to intended inputs and is advantageous in obtaining a fast response which is needed if rapid pen movements are to be detected. Implementation of the circiut can be simple. Conveniently, the switch circuit of each sensing element includes switch means, for example a field effect transistor, connected across the charge storage means and operable by control means which includes the photosensitive device. With such a circuit the threshold level can be readily selected. The control means may comprise a photosensitive potential divider circuit. Alternatively, the control means may comprise a photovoltaic circuit, for example comprising one or more photodiodes, producing a voltage in response to illumination. When the incident illumination exceeds the predetermined intensity level, the control means operates the switch means to discharge the charge storage means upon the voltage of its control (gate) electrode reaching its operating threshold voltage. Switch means comprising field effect transistors have a fairly sharply defined gate threshold for switching. This switching of the switch means occurs very rapidly, and consequently the sensing element is capable of responding to illumination of very short duration, as would happen if the light source being moved over the array of sensing elements quickly.

Although the sensing elements require additional components, this does not cause undue complication. In practice, the array of sensing elements is preferably formed on an insulating support using thin film technology to fabricate the components and their interconnections. Thus the switching devices and switch means may comprise thin film transistors.

Preferably, the array of sensing elements is addressed via sets of row and column conductors to which the switching devices are connected and each sensing element is driven by applying a selection signal to an address conductor of one set to turn on the element's switching device and by applying at the same time a voltage signal to the associated address conductor of the other set whereby the charge storage means is charged according to the level of the applied voltage. If, thereafter, the sensing element is illuminated by the light source the charge storage means is discharged. The charge state of a sensing element can then be detected when the sensing element is next addressed, by sensing the charging characteristics. Thus detection is not dependent on the simultaneous illumination of the sensing element, and sensing elements illuminated at any time in the interval between successive addresses can be identified. Consequently, the possibility of illuminated sensing elements being undetected due to fast movement of the light pen is avoided.

In a preferred embodiment of the invention, the optical touch input device is combined with a matrix display device comprising an array of display elements each of which comprises a display element electrode, with the array of sensing elements being integrated with the array of display elements on a common support. The display elements may each include a switch element such as a TFT and in this case both the array of sensing elements and the array of display elements may share the same sets of row and column address conductors for convenience. In this case, the selection signals applied for example to the row conductors to operate the switching devices of the sensing elements serve also to operate the switching elements of the display elements, and the data signals for the display elements which are applied to the column conductors serve as the voltage signals for charging the charge storage means of the sensing elements. An integrated active matrix display device and optical touch input device driven in this manner is described in European Patent Application 91203273.7. By using the drive signals applied for display purposes also to drive the sensing elements through shared sets of row and column conductors considerable simplification of the device's display and sensing element's panel and the associated driving circuitry is obtained.

BRIEF DESCRIPTION OF THE DRAWING

An optical touch input device, and particularly an integrated optical touch input and display device, in accordance with the invention will now be described, by way of example, with reference to the accompanying drawings, in which.

DETAILED DESCRIPTION OF THE PREFERRED EMBODIMENT

Although the particular embodiment of the invention which will be described is in the form of an integrated display/optical touch input device, it should be understood that the invention is not restricted to such integrated devices but relates to optical touch input devices generally, either as a stand-alone device for use as in input device to, for example, a computer system or in combination with a display device other than in an integrated manner, for example as a device for overlying a display screen but fabricated separately therefrom.

Figure 1:
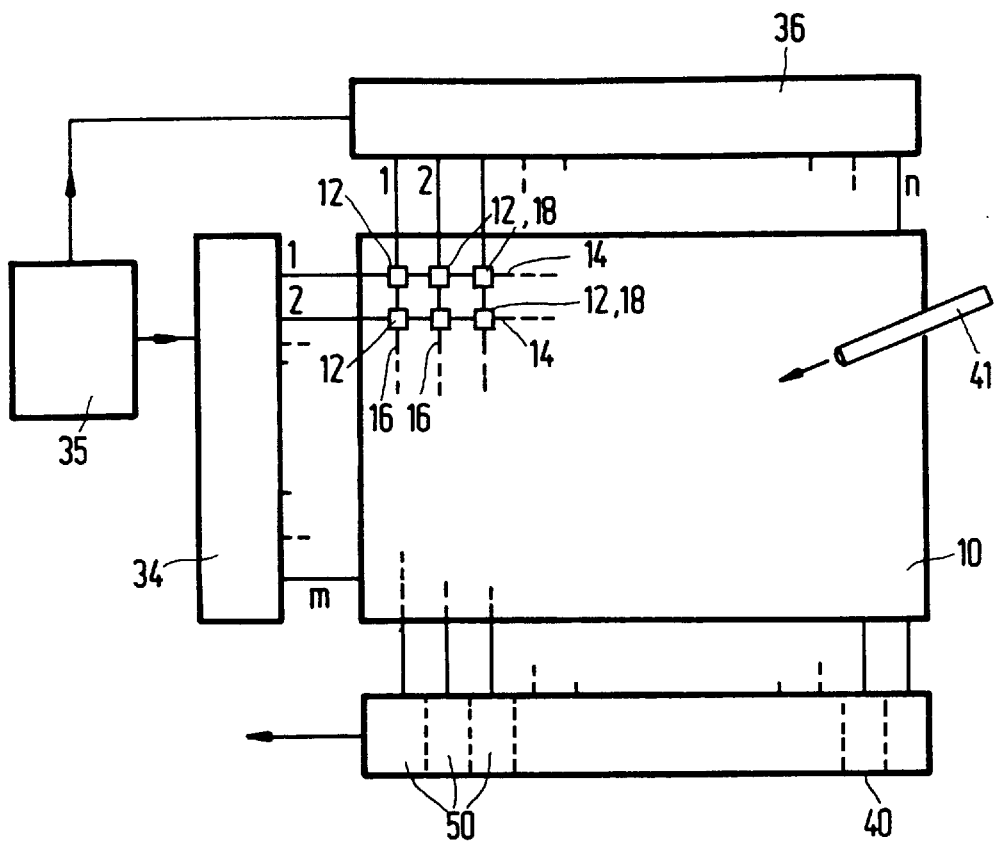
FIG. 1 is a schematic diagram of the integrated optical touch input and liquid crystal display device.

Referring now to FIG. 1, the integrated optical touch input/display device comprises an active matrix addressed liquid crystal display panel, 10, having a row and column array of individually operable picture elements which consists of m rows (1 to m) with n horizontally arranged picture elements (1 to n) in each row. Each picture element, referenced at 12, is located at a respective intersection between crossing sets of m row address conductors 14 and n column address conductors 16. Only a few of the picture elements are shown in FIG. 1, for clarity. The panel is suitable to provide a datagraphic display or a picture display.

The panel 10 also comprises a matrix array of sensing elements, 18, integrated with the array of picture elements, there being one sensing element located adjacent each picture element 12, except for the first column of picture elements, giving a high resolution sensing capability.

Figure 2:
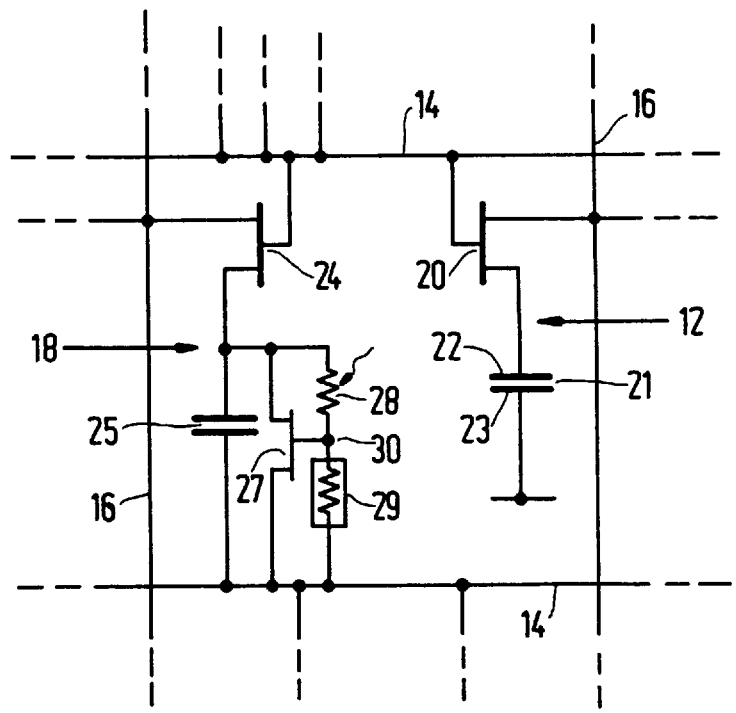
FIG. 2 is a schematic circuit diagram of a part of an optical touch input/display panel of the device illustrating particularly one form of a typical sensing element combined with a picture element of the panel.

The circuit of an example of one typical combination of picture and sensing elements is shown in FIG. 2. The picture element 12 comprises a switching device in the form of a thin film field effect transistor, TFT, 20 connected with a liquid crystal display element 21, the impedance of the display element being represented by a capacitor. The gates of all TFTs 20 of the picture elements in one row are connected to a respective one of the row address conductors 14. The sources of all TFTs 20 of picture elements in one column are connected to a respective one of the column address conductors 16. The drain terminals of the TFTs 20 are connected to a first electrode 22 of their associated display elements 21. As in standard practice in matrix liquid crystal display devices using TFT switches, the sets of row and column address conductors 14 and 16, the TFTs 20, and the display element first electrodes 22 are all carried on a transparent supporting plate of insulating material, for example glass. The panel 10 comprises a second transparent supporting plate arranged parallel to, and spaced from, this supporting plate, which second plate carries a continuous transparent conductive layer constituting an electrode, 23, common to all display elements. Twisted nematic liquid crystal material is disposed between the two plates, the plates being sealed together around their periphery. The opposing plates are provided internally with orientation layers and externally with polarising layers in the usual manner.

Each sensing element 18 includes a switch device comprising a TFT 24. In similar manner to the TFTs 20 of the picture elements, the gates of all TFTs 24 of sensing elements in the same row and connected to a respective one of the row address conductors 14 and the sources of all TFTs 24 of sensing element in the same column are connected to a respective one of the column address conductors 16. The drain of the TFT 24 of a sensing element is connected to one side of a charge storage means 25 in the form of a capacitor. The other side of the capacitor is connected to an adjacent row address conductor 14 associated with the next row of picture/sensing elements. In an alternative arrangement the capacitor of a sensing element may instead be connected to a dedicated auxiliary row conductor which extends in the row direction parallel to and between adjacent row address conductors 14 and which is common to the capacitors of all sensing elements in a row. In a further alternative arrangement, the source of the TFT 24 may be connected to the same column address conductor 16 as the TFT 20 rather than the adjacent column conductor associated with the adjacent column of picture elements as shown.

The sensing element 18 further includes a discharge circuit connected in parallel with the capacitor 25 between the source of TFT 24 and the adjacent row conductor 14 which comprises a further TFT, 27, acting as a switch and having a fairly sharply defined gate threshold, whose source and drain terminals are connected respectively to opposite sides of the capacitor 25, and control means for controlling the switching operation of the TFT 27. The control means includes a photosensitive device and comprises a potential divider circuit connected in parallel with the TFT 27 and consisting of a photosensitive resistor 28 and light shielded resistor 29 connected in series with the node between the two resistors, indicated at 30, being coupled to the gate terminal of the TFT 27.

The components 24, 25, 27, 28 and 29 of all the sensing elements in the array, together with their interconnections, are provided on the same supporting plate as the TFTs 20, the first electrodes 22 of the display elements 21, and the sets of row and column address conductors. The arrays of picture and sensing elements and the sets of row and column address conductors are fabricated on the supporting plate using technology commonly employed in the manufacture of active matrix liquid crystal display devices. This technology, which typically involves the deposition and definition of superimposed thin film layers, is well established and widely documented and it is not thought necessary therefore to describe here in detail such fabrication techniques. Examples of suitable manufacturing processes are described in the aforementioned U.S. Pat. No. 4,345,248, details of which are incorporated herein by reference. The TFTs 20, 24 and 27 may comprise hydrogenated amorphous silicon TFTs, and the photo-resistors 28 and resistors 29 may comprise amorphous silicon material. The display element electrodes can comprise ITO, and the row and column conductors and the plates of the capacitors 25 may comprise metal, for example aluminium or chromium, or ITO. Other materials can of course be used, as will be apparent to persons skilled in the art.

The photosensitive device can comprise other forms of photo conductive devices which exhibit an increase in conductance in response to being illuminated. For example, a photo-diode, comprising a pin, nip, Schottky, or other like photo-diode, could be used. Also, the photosensitive element could be a kind of phototransistor in the form of a TFT whose gate is connected to its source. The resistor 29 could comprise a similar TFT which is shielded from light.

The integrated device is operated in a manner similar to that described in European Patent Application No. 91203273.7. Briefly, and referring to FIG. 1, the picture and sensing elements are driven by way of a row drive circuit 34, comprising a digital shift register, controlled by a timing and control circuit 35, and a column drive circuit 36, comprises a sample and hold circuit operated by a shift register to perform serial to parallel conversion on serial data supplied from the timing and control circuit 35. The circuit 34 applies a selection, (gating), signal to each row address conductor 14 in turn, and holds each conductor 14 at a reference potential level in the interval between successive selection signals. The TFTs 20 of the picture elements in a row are turned on by the selection signal on their associated row address conductor whereupon the data signals present on the column address conductors 16 are transferred to the respective display elements 21 of that row. Thus, the picture elements are driven in a conventional manner and light transmission through the display elements is modulated in accordance with the level of the applied data signal. Each display element can produce a range of display effects, i.e. grey scale, depending on the value of the assigned data signal. In a variant, the data signals may be binary signals producing a two level display output, light and dark, from the display elements. In this case the column drive circuit can be of simplified form comprising a digital circuit, for example a shift register circuit with latched outputs.

Each row of picture elements is addressed in this manner in sequence once in each successive field period.

In order to prevent degradation of the liquid crystal material, the polarity of the drive voltages applied to the display elements is periodically inverted, in accordance with known practice, for example after every field.

For reasons which will become apparent, part of the inverting column conductor data signals preferably is applied to the common electrode 23 of the display elements so that the range of data signal voltages present on the column conductors 16 is minimised.

The ends of the column address conductors 16 remote from the circuit 36 are connected to a detection circuit 40 which comprises a set of sense amplifiers, 50, one for each column conductor, whose function is to provide an output indicative of whether or not individual sensing elements 18, have been illuminated by, for example, a light pen referenced at 41 in FIG. 1. The detection circuit periodically interrogates the sensing elements to sense the charge state of their capacitors 25, which for an element illuminated by the light differs from that for an element no so illuminated as will be explained, and provides an output in accordance therewith thus identifying those sensing elements subjected to illumination from the light pen in the interval between successive addressing. The light pen 41, which consists of a light source which continuously emits in operation a narrow, intense beam of light of a wavelength to which the photosensitive elements 28 of the sensing elements are responsive, can be moved over the display panel whereby sensing elements located under the path of travel of the light pen are illuminated. The detection of those sensing elements which have been illuminated in this manner, representing the pattern of the light pen movement, enables data or information to be written into the device. If a high resolution input is required, the size of the beam should be sufficiently narrow to illuminate only one sensing element of the array at any given time.

Figure 3:
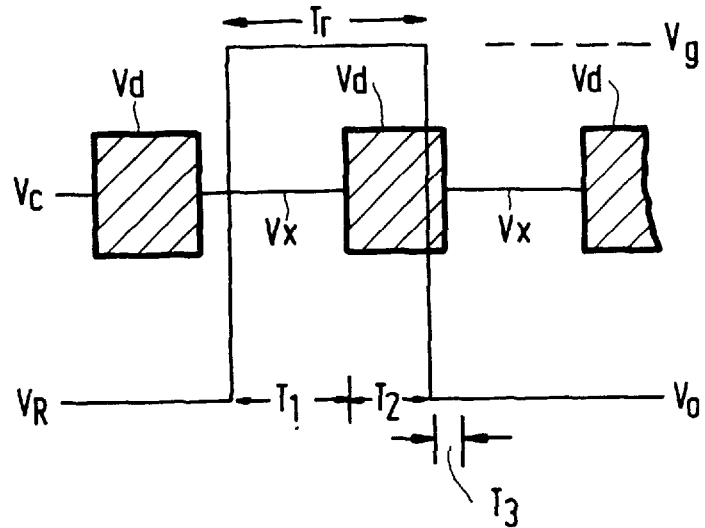
FIG. 3 illustrates typical waveforms and relative timings present in operation of the device of FIGS. 1 and 2.

Examples of the signal waveforms applied to row and column address conductors in operation are illustrated in FIG. 3, in which $V_R$ and Vc are respectively the row and column voltage waveforms. The row selection signal comprises a pulse of duration $T_r$ and magnitude $V_g$. For the remainder of the field period $T_F$, where $T_F$ can be approximately equal to m.Tr, the row conductor is held at a constant reference level $V_0$.

Successive data signals intended for picture elements in the same column, and having a range of possible values according to the display effects desired, are indicated at Vd and applied by the column driver circuit 36 to the column conductor 16 for a part only, shown at T2, of the duration of the selection signal. The circuit 36 is modified so as to present a high impedance to the column conductor in the intervals between successive data signals being applied and during these intervals a constant predetermined potential, indicated at Vx, is applied to the column conductor by the detection circuit 40. Thus during the first part, T1, of the row selection period Tr for a row address conductor 14 the column drive circuit is switched to a high impedance state and during the latter part, T2, of the row selection period the data signal Vd is applied to the column conductor 16 causing the display element 21 associated with these row and column conductors to be charged to a voltage, $V_{LC}$, given by:

$$V_{LC} = Vd - Ve$$

where Ve is the voltage of the electrode 23 common to all display elements.

The selection signal pulse Vg applied to the row conductor 14 also turns on the TFTs 24 of the associated row of sensing elements 18 whereby during the period T2 the capacitors 25 of the sensing elements are charged to a voltage level, Vs, according to the voltage present on their respective column conductor, given by:

$$Vs = Vd - Vo$$

bearing in mind that the other side of the capacitors as this time is held at the reference level Vo. If the mean data signal voltage (Vd) is Vm and the range of possible data signal voltages is 2Vn then Vs can be in the range (Vm+Vn−Vo) to (Vm−Vn−Vo).

Following termination of the row selection signal (Vg) the TFTs 24, and the TFTs 20, are turned off, thereby isolating the capacitors 25 and display elements 21, until the row is next addressed in the subsequent field period.

If during the interval between successive addressing a sensing element is not written into by the light, the charge on its capacitor 25 will be unaffected, apart perhaps from some minor leakage. If, on the other hand, a sensing element is "written" with the light pen then its capacitor 25 will be discharged. During this interval the node 30 of the potential divider constituted by the photoresistor 28 and the light-shielded resistor 29 is positive with respect to the potential of the succeeding row conductor 14. The operation TFT 27, whose gate is connected to the node 30, is controlled by the potential divider. The voltage at node 30 is normally below the gate threshold voltage required to turn on the TFT 27. However when the intensity of light falling on the photoresistor 28 reaches or exceeds a certain value, as happens when the light pen is moved over the sensing element, the voltage at the node 30 increases and exceeds the threshold voltage of TFT 27 thereby turning it on and discharging the capacitor 25. The potential divider, 28 and 29, together with the TFT 27 therefore act in combination as an optical threshold circuit which operates to discharge the capacitor in response to the sensing element being subjected to a certain minimum light intensity level. The component values of the control means can readily be selected to provide different threshold levels as required. At the instant this minimum level is reached the TFT 27 rapidly discharges the capacitor 25. Ambient lighting levels are below this minimum and so without light pen illumination the TFT 27 remains off and the charge on capacitor 25 is retained. Thus the sensing element 18 is adapted to distinguish between light from the light pen and light from ambient surroundings and to provide a clear and definite reaction to illumination by the light pen.

At the start of the next row selection pulse signal applied to the row conductor 14, i.e. at the beginning of period T1, the TFTs 20 and 24 associated with that row are again turned on. The voltage of the column conductors 16 at this time is set by the detection circuit 40 to Vx and the charging current required to charge the capacitors 25 and the display elements 21 to the column voltage Vx flows via the detection circuit 40 where it is sensed. For sensing elements which have been subjected only to ambient illumination in the preceding field period the amount of charging current which flows to their capacitors will be at most very low, bearing in mind that a capacitor 25 could previously have been charged to any voltage in the possible range of Vd, and the voltage across the capacitor 25 is now reset to Vx−Vo. The maximum charge flowing into a capacitor 25 will be substantially in the range +2CVn to −2CVn, where C is the capacitance. In the case where a sensing element 18 has been written with the light pen then its capacitor 25 is discharged completely so that a charge C(Vx−Vo) will flow into its capacitor 25.

The sense amplifiers of the detection circuit 40, which may be current or charge sensing amplifiers, are responsive to the charges supplied to the capacitors 25 in the period T1. After amplification in the sense amplifiers the signals produced as a result of the recharging of the capacitors 25 are passed to discrimination circuits of the detection circuit 40 whose outputs switch state according to whether or not that signal is indicative of a "written" or an "unwritten" sensing element.

The detection circuit 40 and its manner of operation is the same as that described in European Patent Application No. 91203273.7 to which reference is invited for further details. It should be appreciated however that other forms of detection circuit could be employed for sensing the states of the sensing elements as will be apparent to skilled persons. The serial, or parallel, output of the detection circuit 40 may be supplied to one input of a data processing circuit, with an associated memory device, which provides signals to the column driver circuit for display purposes, in similar manner to that described in U.S. Pat. No. 4,345,248.

This operation of the detection circuit is repeated for each row of sense elements, in synchronism with the addressing of the rows of picture elements, so that the states of the array of sensing elements are determined over the course of the display field, the array being repeatedly addressed in this manner in successive display fields.

Figure 4:
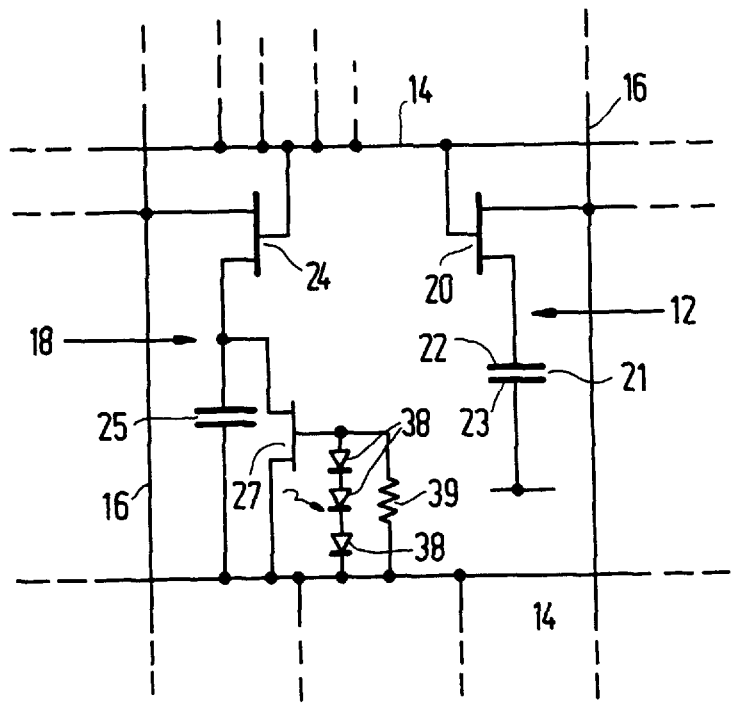
FIG. 4 is a schematic circuit diagram, similar to FIG. 2, illustrating another form of sensing element.

FIG. 4 illustrates an alternative form of discharge circuit which can be used in the sensing elements. In this circuit, the control means controlling operation of the TFT 27 comprises a photovoltaic circuit rather than a photosensitive potential divider circuit as previously. The photovoltaic circuit consists of at least one, and preferably a plurality of series connected photodiodes 38 connected in parallel with a light shielded resistance 39 between the gate terminal of the TFT 27 and the row address conductor 14 and operating in photovoltaic mode. The control means responds to incident light to generate a voltage at the gate terminal of the TFT 27 according to the intensity of this incident light. The TFT 27 is operated when the intensity level of incident light is such as to cause a voltage at the gate terminal at or above the gate threshold voltage.

The invention is, as previously stated, applicable to optical touch input devices generally. For an embodiment of the optical touch input device providing solely an optical sensing function, the structure and operation of the device are considerably simplified compared with the above-described integrated display/optical touch sensing device. The panel 10 need then only comprise one supporting plate carrying the array of sensing elements 18 and row and column address conductors 14 and 16, again formed using thin film techniques as previously described. The circuitry on this supporting plate is protected by an overlying layer of optically transparent material, such as silicon nitride. The column driver circuit 36 is dispensed with. The row driver circuit 34 operates as before to select the row of sensing elements, one at a time in turn. During a row selection period, the detection circuit 40 operates to apply the predetermined potential Vx to the column conductors, so that the capacitors 25 of the row of sensing elements are charged to the level of Vx–Vo. If thereafter, and during the interval until that row is next selected, a sensing element in the row is illuminated with the light pen its capacitor is discharged, otherwise its charge remains substantially the same. Detection of those sensing elements which have been illuminated is accomplished in a relatively simple manner by the detection circuit 40 by sensing whether or not a charging current is required by the sensing elements at the next selection period.

From reading the present disclosure other modifications and variations will be apparent to persons skilled in the art. Such modifications and variations may involve equivalents and other features which are already known in the design, manufacture and use of optical touch input devices, either with or without integrated display element arrays, an component parts thereof which may be used instead of, or in addition to, features already described herein.

We claim:

1. An optical touch input device comprising an array of sensing elements. each of which sensing elements comprises a photosensitive device responsive to a light input from a light source, a switching device, and a charge storage means which is charred periodically by operation of the switching device, and detection means connected to the sensing elements for detecting periodically the state of charge of their charge storage means, characterised in that the photosensitive device comprises part of a discharge circuit connected to the charge storage means for discharging the charge storage means in response to a light input from a light source which discharge circuit has a light intensity dependent operational threshold characteristic such that in response to light falling on the photosensitive device which is at or above a predetermined intensity level it is operable to discharge the charge storage means and such that in response to light falling on the photosensitive device which is below said predetermined intensity level the charge storage means is not discharged, characterised in that the discharge circuit comprises a switch circuit which switches to discharge the charge storage means in response to the photosensitive element being subjected to light which is at or above the predetermined intensity level.

2. A device according to claim 1 characterised in that the discharge circuit of each sensing element includes switch means connected across the charge storage means and operable by control means comprising the photosensitive device to discharge the charge storage means.

3. A device according to claim 2, characterised in that the control means comprises a photosensitive potential divider circuit.

4. A device according to claim 3, characterised in that photosensitive device comprises a photoconductive device whose conductance varies in accordance with the level of light incident thereon.

5. A device according to claim 2, characterised in that the control means comprises photovoltaic means which produces a voltage in response to light incident thereon.

6. A device according to claim 5, characterised in that the photosensitive device comprises at least one photodiode.

7. A device according to claim 2, characterised in that the switch means comprises a field effect transistor whose source and drain terminals are connected across the charge storage means and whose gate terminal is connected to the control means.

8. A device according to claim 1, characterised in that the device includes sets of row and column address conductors to which the sensing elements are connected via their switching devices and a drive circuit connected to the sets of address conductors for applying drive signals to the address conductors so as to operate periodically the switching devices and charge their associated charge storage means.

9. A device according to claim 7, characterised in that the switching device of each sensing element comprises a field effect transistor which is turned on periodically by selection signals applied by the drive circuit to an address conductor of one set so as to connect the charge storage means of the sensing element to an address conductor of the other set through which charging current is supplied to the charge storage means, and in that the detection means is arranged to sense the charging current supplied to the charge storage devices upon operation of the switching device.

10. A device according to claim 1 and further comprising an array of display elements constituting a display device, with each display element including a display element electrode and with the array of sensing elements being integrated with the array of display element electrodes on a common support.

* * * * *